(12) United States Patent
Iwaki

(10) Patent No.: US 10,662,501 B2
(45) Date of Patent: May 26, 2020

(54) METHOD OF PRODUCING PLATINUM COLLOID AND PLATINUM COLLOID PRODUCED THEREBY

(71) Applicant: INOVEX CO., LTD., Shizuoka (JP)

(72) Inventor: Hiroshi Iwaki, Tokyo (JP)

(73) Assignee: INOVEX CO., LTD., Shizuoka (JP)

( * ) Notice: Subject to any disclaimer, the term of this patent is extended or adjusted under 35 U.S.C. 154(b) by 351 days.

(21) Appl. No.: 15/749,464

(22) PCT Filed: Dec. 22, 2016

(86) PCT No.: PCT/JP2016/088419
§ 371 (c)(1),
(2) Date: Jan. 31, 2018

(87) PCT Pub. No.: WO2017/111046
PCT Pub. Date: Jun. 29, 2017

(65) Prior Publication Data
US 2018/0223390 A1 Aug. 9, 2018

(30) Foreign Application Priority Data
Dec. 25, 2015 (JP) ................................ 2015-253592

(51) Int. Cl.
*B22F 9/24* (2006.01)
*C22B 11/06* (2006.01)
(Continued)

(52) U.S. Cl.
CPC ........... *C22B 11/06* (2013.01); *B01J 13/0043* (2013.01); *B22F 1/0022* (2013.01); *B22F 3/001* (2013.01);
(Continued)

(58) Field of Classification Search
CPC ..... B01J 13/0043; B22F 2301/25; B22F 9/24; C01G 55/005
See application file for complete search history.

(56) References Cited

U.S. PATENT DOCUMENTS 4,652,311 A * 3/1987 Gulla ...................... C23C 18/30
106/1.11
6,455,594 B1 * 9/2002 Tsuji .................... B01J 13/0043
424/649
(Continued)

FOREIGN PATENT DOCUMENTS

| JP | H10-068008 A | 3/1998 |
| JP | H10-176207 A | 6/1998 |

(Continued)

OTHER PUBLICATIONS

International Preliminary Report on Patentability, issued in corresponding International Application No. PCT/JP2016/088419, dated Jul. 5, 2018, 6 pages.
(Continued)

*Primary Examiner* — Michael A Salvitti
(74) *Attorney, Agent, or Firm* — Rothwell, Figg, Ernst & Manbeck, P.C.

(57) ABSTRACT

The disclosure provides a method of producing a platinum colloid comprising reducing platinum ions by the use of a platinum ion solution, water, a nonionic surfactant, a pH adjusting agent, and a reducing agent, wherein
the platinum ion solution contains platinum at a concentration of 20 w/v %,
the nonionic surfactant is polysorbate 80,
the pH adjusting agent is an alkaline metal salt,
the reducing agent is a lower alcohol,
the volume of the water is from 600 to 660 times that of the platinum ion solution,
(Continued)

the volume of the nonionic surfactant is from 0.20 to 0.30 times that of the platinum ion solution, the volume of the pH adjusting agent as a 5 w/v % aqueous solution is from 10 to 30 times that of the platinum ion solution, and the volume of the reducing agent is from 27 to 37 times that of the platinum ion solution, as well as the platinum colloid produced by the method.

8 Claims, 3 Drawing Sheets

(51) Int. Cl.
*B22F 1/00* (2006.01)
*B01J 13/00* (2006.01)
*B22F 3/00* (2006.01)
*C01G 55/00* (2006.01)
*C22B 3/00* (2006.01)

(52) U.S. Cl.
CPC .............. *B22F 9/24* (2013.01); *C01G 55/005* (2013.01); *C22B 11/04* (2013.01); *B22F 2301/00* (2013.01); *B22F 2301/25* (2013.01)

(56) References Cited

U.S. PATENT DOCUMENTS

| | | | | |
|---|---|---|---|---|
| 7,452,554 | B2* | 11/2008 | Miyamoto | A23L 2/52 424/489 |
| 7,820,205 | B2* | 10/2010 | Takakusagi | A61K 9/0095 424/484 |
| 2006/0024382 | A1* | 2/2006 | Miyamoto | A23L 2/52 424/649 |
| 2008/0031953 | A1* | 2/2008 | Takakusagi | A61K 9/0095 424/484 |
| 2018/0223390 | A1* | 8/2018 | Iwaki | B01J 13/0043 |

FOREIGN PATENT DOCUMENTS

| | | |
|---|---|---|
| JP | 2001-079382 A | 3/2001 |
| JP | 2001-122723 A | 5/2001 |
| JP | 2002-212102 A | 7/2002 |
| JP | 2002-356415 A | 12/2002 |
| JP | 2005-163117 A | 6/2005 |
| JP | 2005-270938 A | 10/2005 |
| JP | 2005-298730 A | 10/2005 |
| JP | 2007-297281 A | 11/2007 |
| JP | 2008-169151 A | 7/2008 |
| JP | 2009-1525 A | 1/2009 |
| JP | 2009-167478 A | 7/2009 |
| WO | 2005/023467 A1 | 3/2005 |
| WO | 2006/038528 A1 | 4/2006 |

OTHER PUBLICATIONS

International Search Report issued in corresponding International Application No. PCT/JP2016/088419, dated Mar. 21, 2017, 2 pages.

Extended European Search Report dated Jun. 12, 2018, issued in European Patent Application No. 16878932.9, 7 pages.

* cited by examiner

METHOD OF PRODUCING PLATINUM COLLOID AND PLATINUM COLLOID PRODUCED THEREBY

CROSS REFERENCE TO RELATED APPLICATION(S)

This application is a 35 U.S.C. § 371 National Phase Entry Application from PCT/JP2016/088419, filed Dec. 22, 2016, designating the United States, and also claims the benefit of Japanese Application No. 2015-253592, filed Dec. 25, 2015. The disclosures of both applications are incorporated herein in their entirety by reference.

TECHNICAL FIELD

The disclosure relates to a method of producing a platinum colloid and the platinum colloid produced by the method.

BACKGROUND ART

A platinum colloid, which is a colloidal suspension comprising platinum particles dispersed in water, is known to have a reducing activity, i.e., an antioxidative activity (Patent Literatures 1 to 3 and 10). The platinum colloid has been used to produce various products such as drinks, medical products, and cosmetic products. The platinum colloid may be prepared by metal salt reduction, in which platinum ions are reduced in the presence of a colloid-protecting agent to give the platinum colloid. Production of the platinum colloid by metal salt reduction has been reported using colloid-protecting agents such as polysorbate 80 (Patent Literatures 1 to 3), glycerol fatty acid esters (Patent Literature 7), lecithin, saponin (Patent Literature 11), and ether-type nonionic surfactants (Patent Literature 13). Nevertheless, in view of the utility of platinum colloids, there is a need for a novel method for producing an improved platinum colloid that has a better antioxidative activity.

REFERENCES

Patent Literature

[Patent Literature 1] JP-A-H10-068008
[Patent Literature 2] JP-A-H10-176207
[Patent Literature 3] JP-A-2001-079382
[Patent Literature 4] JP-A-2001-122723
[Patent Literature 5] JP-A-2002-212102
[Patent Literature 6] JP-A-2002-356415
[Patent Literature 7] JP-A-2005-163117
[Patent Literature 8] JP-A-2005-270938
[Patent Literature 9] JP-A-2005-298730
[Patent Literature 10] JP-A-2007-297281
[Patent Literature 11] JP-A-2008-169151
[Patent Literature 12] JP-A-2009-001525
[Patent Literature 13] JP-A-2009-167478
[Patent Literature 14] WO2006/038528

SUMMARY OF THE INVENTION

An object of the disclosure is to provide a method of producing a platinum colloid having a good antioxidative activity.

In an aspect, provided is a method of producing a platinum colloid comprising reducing platinum ions by the use of a platinum ion solution, water, a nonionic surfactant, a pH adjusting agent, and a reducing agent, wherein
the platinum ion solution contains platinum at a concentration of 20 w/v %,
the nonionic surfactant is polysorbate 80,
the pH adjusting agent is an alkaline metal salt,
the reducing agent is a lower alcohol,
the volume of the water is from 600 to 660 times that of the platinum ion solution,
the volume of the nonionic surfactant is from 0.20 to 0.30 times that of the platinum ion solution,
the volume of the pH adjusting agent as a 5 w/v % aqueous solution is from 10 to 30 times that of the platinum ion solution, and
the volume of the reducing agent is from 27 to 37 times that of the platinum ion solution.

In a further aspect, the platinum colloid produced by the method is provided.

The platinum colloid produced by the method has an improved antioxidative activity.

DETAILED DESCRIPTION

Figure 1:
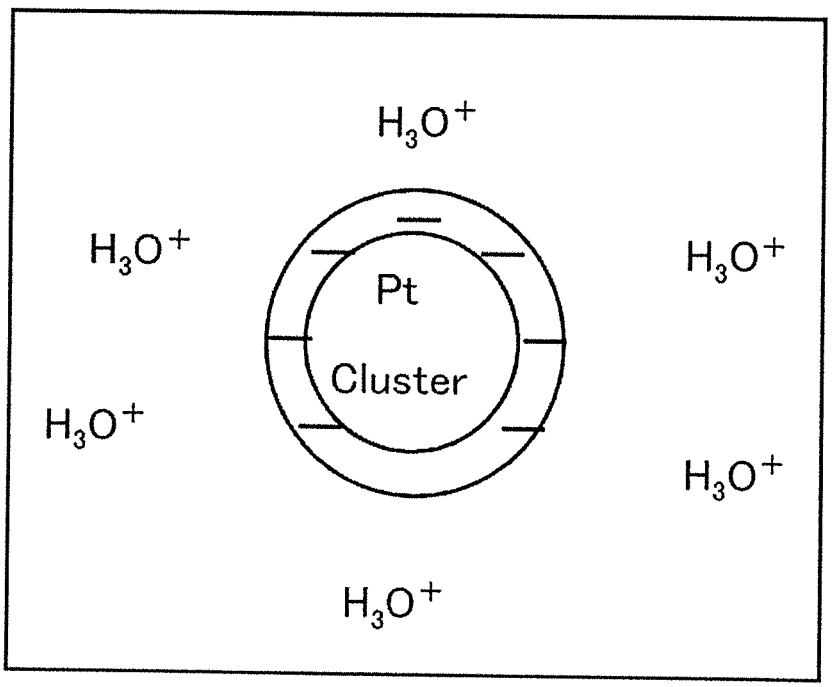
FIG. 1 is a schematic drawing of the platinum colloid produced by the method disclosed herein.

The disclosure relates to a method of producing a platinum colloid comprising reducing platinum ions by the use of a platinum ion solution, water, a nonionic surfactant, a pH adjusting agent, and a reducing agent.

As used herein, the term "about" means a range of ±10%, preferably a range of ±5%.

The platinum ion solution is a solution of platinum halide, which may be prepared by dissolving commercially available platinum halide in water. Preferably, the platinum ion solution is an aqueous solution of chloroplatinic acid. The platinum ion solution contains platinum at a concentration of 20 w/v %.

The volume of the water used in the method is from 600 to 660 times, preferably from 620 to 650 times, that of the platinum ion solution. In a preferred embodiment, the volume of the water is from 620 to 630 times that of the platinum ion solution.

The nonionic surfactant plays a role of a colloid-protecting agent. Polysorbate 80 is used as the nonionic surfactant. Polysorbate 80 is available from many suppliers including NOF CORPORATION. The volume of the nonionic surfactant used in the method is from 0.20 to 0.30 times, preferably from 0.24 to 0.30 times, that of the platinum ion solution. In a preferred embodiment, the volume of the nonionic surfactant is from 0.26 to 0.28 times that of the platinum ion solution.

A lower alcohol is used as the reducing agent. As used herein, the term "lower alcohol" means an alcohol of 1 to 6 carbon atoms. The reducing agent is preferably ethanol. The volume of the reducing agent used in the method is from 27 to 37 times, preferably from 30 to 37 times, preferably from 30 to 35 times, that of the platinum ion solution. In a preferred embodiment, the volume of the reducing agent is from 32 to 35 times that of the platinum ion solution.

An alkaline metal salt is used as the pH adjusting agent. Examples of the alkaline metal salt include sodium hydroxide, potassium hydroxide, sodium carbonate, potassium carbonate, and sodium bicarbonate. The pH adjusting agent is preferably sodium bicarbonate. The pH adjusting agent is added to a reaction mixture as an aqueous solution, preferably a 5 w/v % aqueous solution, of the pH adjusting agent. In this method, the volume of the pH adjusting agent as a 5 w/v % aqueous solution is from 10 to 30 times, preferably from 16 to 24 times, preferably from 18 to 22 times, that of the platinum ion solution. In a preferred embodiment, the volume of the pH adjusting agent as a 5 w/v % aqueous solution is from 19 to 21 times that of the platinum ion solution.

In this method, the volume of the water is from 600 to 660 times that of the platinum ion solution, the volume of the nonionic surfactant is from 0.20 to 0.30 times that of the platinum ion solution, the volume of the pH adjusting agent as a 5 w/v % aqueous solution is from 10 to 30 times that of the platinum ion solution, and the volume of the reducing agent is from 27 to 37 times that of the platinum ion solution.

In a preferred embodiment, the volume of the water is from 620 to 630 times that of the platinum ion solution, the volume of the nonionic surfactant is from 0.26 to 0.28 times that of the platinum ion solution, the volume of the pH adjusting agent as a 5 w/v % aqueous solution is from 19 to 21 times that of the platinum ion solution, and the volume of the reducing agent is from 32 to 35 times that of the platinum ion solution.

For example, the method is carried out as follows. Water is heated with stirring to a desired temperature (e.g., from 45 to 65° C., preferably from 45 to 55° C., more preferably about 50° C.) and then the nonionic surfactant and the reducing agent are added to the water. The reaction mixture is further heated with stirring to a temperature suitable for the reduction reaction, i.e., from 50 to 75° C., preferably from 65 to 75° C., more preferably about 70° C. The platinum ion solution and the pH adjusting agent are added to the mixture e at the same time. The reducing agent reacts with the platinum ions and the reduction reaction of the platinum ions occurs in the water. Stirring is continued while the temperature of the mixture is kept constant. The heating and stirring is stopped when the platinum ions are reduced. The reduction of the platinum ions may be confirmed by the color of the mixture. The mixture is discolored to black when the platinum ions are reduced. As the result of the reduction reaction, the platinum colloid is produced in the reaction mixture.

In the Examples below the nonionic surfactant and the reducing agent were added after the water was heated to the desired temperature, and then the platinum ion solution was added to the mixture. In another embodiment, the water is heated, the nonionic surfactant is added to the heated water, and after the mixture is further heated to the desired temperature, the platinum ion solution and the pH adjusting agent are added thereto, and then the reducing agent is added to the thus obtained mixture.

After the reduction reaction is finished, the mixture may be filtered for excluding contaminants such as dust. For the filtration, a filter having a retaining particle size of from 0.5 to 5 μm, preferably 1 μm may be used. Subsequently, ultrafiltration may be carried out for e.g. desalination, with addition of purified water to the mixture. For the ultrafiltration, an ultrafilter having molecular weight cut off of from 5,000 to 50,000, preferably from 10,000 to 30,000 may be used. In a preferred embodiment, an ultrafilter having molecular weight cut off of 30,000 is used. Typically, sterilization and further filtration are carried out subsequently.

The particle size of each single platinum particle in the platinum colloid produced by the method disclosed herein ranges from about 2 to 10 nm. The zeta potential of the platinum colloid is from about −20 to −50 mV.

As demonstrated in the following Examples, the platinum colloids produced by the method disclosed herein exhibited a better antioxidative activity in antioxidation tests using DCIP or DPPH than the platinum colloids produced by conventional methods, whereas size of each single platinum particle, particle size distribution, zeta potential, and redox potential are not significantly different among them.

The following Examples illustrate some embodiments of the present invention.

EXAMPLES

1. Production of Platinum Colloids

Example 1 (Lot No.: 5016)

A. Materials

TABLE 1

| | | |
|---|---|---|
| water | | 4700 ml |
| reducing agent | ethanol (99.5%) | 250 ml |
| protecting agent | polysorbate 80 (NOF CORPORATION, OT-221R) | 2 ml |
| platinum ion solution | aqueous chloroplatinic acid | 7.5 ml (platinum: 1.5 mg) |
| pH adjusting agent | aqueous sodium bicarbonate 7.5 g/150 ml, 5 w/v % | 150 ml |
| total | | 5109.5 ml |

B. Reduction Reaction

Water was poured into a glass vessel and heated with stirring. When the temperature of the water reached 50° C., the reducing agent and the protecting agent were added to the water. The mixture was further heated with stirring. When the temperature reached 70° C., the pH adjusting agent and the platinum ion solution were added at the same time. The mixture was stirred at 70° C. to promote the reduction reaction. When the platinum ions were reduced to form platinum particles, the brown color of the mixture turned black. At that time the heating and stirring were stopped and the reduction process was ended.

The reduction reaction includes three steps as expressed by the following chemical equations.

Step 1: formation of a platinum particle by reduction $$PtCl_6^{2-} + 2CH_3CH_2OH \rightarrow Pt + 2CH_3CHO + 6Cl^- + 4H^+$$

Step 2: hydrogenation of the platinum particle $$mPt + CH_3CH_2OH \rightarrow Pt_mH_2 + CH_3CHO$$

Step 3: dehydrogenation of the platinum particle $$Pt_nH_x \rightarrow Pt_nH_{x-1}^- + H^+ \text{ (}n\text{ is 100 or less)}$$

$Pt_nH_{x-1}^-$: a platinum particle having a negative charge

As shown in the equations above, in Step 1 the platinum ion solution is reduced with the hydrogen group of the reducing agent to form the platinum particle. In Step 2 hydrogen (H) of the reducing agent was added to the surface of the particle to form a colloidal particle comprising the platinum particle and hydrogen. In Step 3 the hydrogen ($H^+$) is dissociated and the colloidal particle is negatively charged. At the same time the dissociated proton ($H^+$) associates to a water molecule ($H_2O$), as represented by the equation: $H^+ + H_2O = H_3O^+$ (FIG. 1).

The protecting agent controls the formation of the platinum particles from the platinum ion solution and protects the formed platinum particles. The pH adjusting agent is added to keep the pH of the mixture near neutral and stabilize the reduction reaction.

C. Wash, Purification, and Dispensing

After the reduction reaction was finished the reaction mixture was kept settled for 12 hours. The platinum colloid was filtered with a filter paper (Quantitative Filters Papers No. 5C, retaining particle size 1 μm, ADVANTEC). The filtered platinum colloid was desalted with an ultrafilter (molecular weight cut off: 10,000, Nihon Millipore K.K) with addition of purified water. This concentration, wash, and purification step was continued until the conductivity of the permeate was decreased. After the ultrafiltration, the concentration of platinum was adjusted at about 500 ppm with purified water. After the adjustment the pH of the platinum colloid was 3.93. Subsequently the platinum colloid was sterilized, filtered with a filter paper, and dispensed into a vessel.

D. Analysis of Platinum Colloid

ICP emission spectrometry revealed that the concentration of platinum in the platinum colloid was 510 ppm.

Electrophoresis (glass cell) revealed that the zeta potential was (−)44.22 mV.

Figure 2:
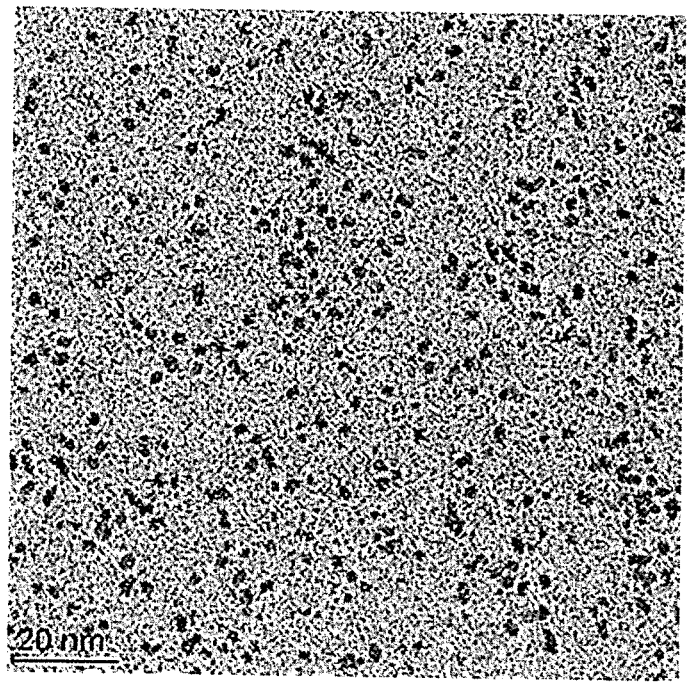
FIG. 2 is an image obtained by observing the platinum colloid of Example 1 with a transmission electron microscope.

FIG. 2 shows an image obtained by observing the platinum colloid with EM-002BF field emission transmission electron microscope (FE-TEM: TOPCON TECHNO-HOUSE). The image was analyzed with software for particle size analysis (ImageJ). The average particle size of the each single platinum particle was 3.5 nm.

Figure 3:
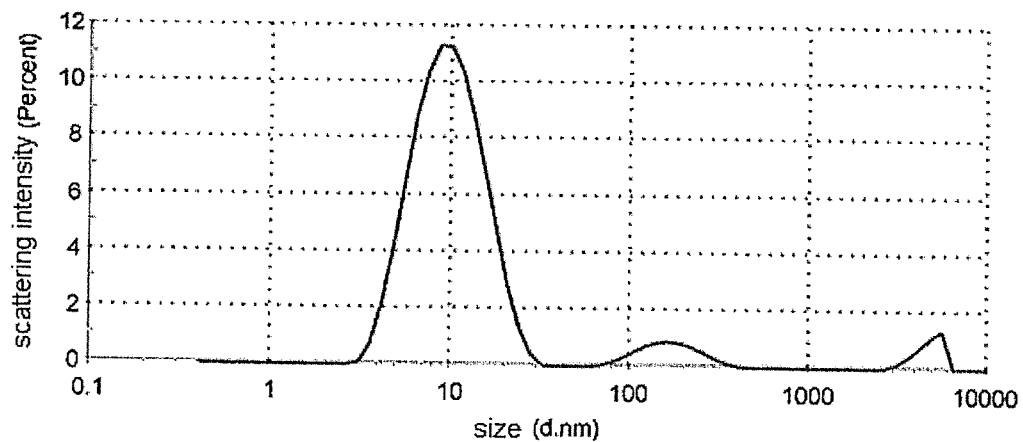
FIG. 3 shows particle size distribution of the platinum colloid of Example 1.

FIG. 3 shows the particle size distribution of the platinum colloid determined by dynamic light scattering (Zetasizer Nano ZS, Malvern), in which an electric field was applied to the platinum particles in the colloid to electrophorese the particles. The measurement demonstrated that 90.3% of the particles had the particle size of about 10.49 nm and 6% of the particles had the particle size of about 174.7 nm. Z-average particle size was 10.11 nm. The results suggest that the single particles, which have the particle size of 3.53 nm as observed with the electron microscopy, form aggregates of about 10 nm, and the aggregates further form larger clusters of about 170 nm, and the clusters are moving in the suspension.

Comparative Example 1 (Lot No.: 0793)

(The method disclosed in JP-A-2001-079382, (Patent Literature 3))

A. Materials

TABLE 2

| water | | 4300 ml |
|---|---|---|
| reducing agent | ethanol (99.5%) | 500 ml |
| protecting agent | polysorbate 80 (NOF CORPORATION, OT-221R) | 5 ml |

TABLE 2-continued

| platinum ion solution | aqueous chloroplatinic acid | 10 ml (platinum: 2 g) |
|---|---|---|
| pH adjusting agent | aqueous sodium bicarbonate 10 g/200 ml, 5 w/v % | 200 ml |
| total | | 5015 ml |

B. Reduction Reaction

Water was poured into a glass vessel and heated with stirring. When the temperature of the water reached 60° C., the reducing agent and the protecting agent were added to the water. The mixture was further heated with stirring. When the temperature reached 70° C., the platinum ion solution and the pH adjusting agent were added at the same time. The mixture was stirred at 70° C. to promote the reduction reaction. When the platinum ions were reduced to form platinum particles, the brown color of the mixture turned black. At that time the heating and stirring were stopped and the reduction process was ended.

C. Concentration, Wash, and Purification

After the reduction reaction was finished the platinum colloid was filtered with a filter paper (Quantitative Filters Papers No. 5C, retaining particle size 1 μm, ADVANTEC). The filtered platinum colloid was kept settled for 12 hours, and then concentrated, washed and purified with an ultrafilter (molecular weight cut off: 10,000, Nihon Millipore K.K) with addition of 8,000 ml of purified water. After the ultrafiltration, the concentration of platinum was adjusted at about 500 ppm with purified water. After the adjustment the pH of the platinum colloid was 3.82. Subsequently the platinum colloid was sterilized, filtered with a filter paper, and dispensed into a vessel.

D. Analysis of Platinum Colloid

ICP emission spectrometry revealed that the concentration of platinum in the platinum colloid was 520 ppm.

Electrophoresis (glass cell) revealed that the zeta potential was (−)21.97 mV.

Figure 4:
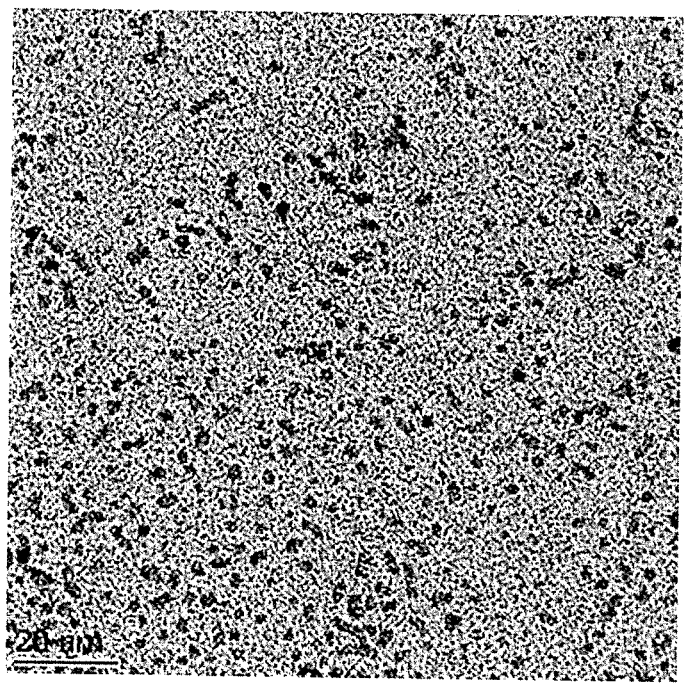
FIG. 4 is an image obtained by observing the platinum colloid of Comparative Example 1 with a transmission electron microscope.

FIG. 4 shows an image obtained by observing the platinum colloid by EM-002BF field emission transmission electron microscope (FE-TEM: TOPCON TECHNO-HOUSE). The image analysis revealed that the average particle size of the each single platinum particle was 3.55 nm.

Figure 5:
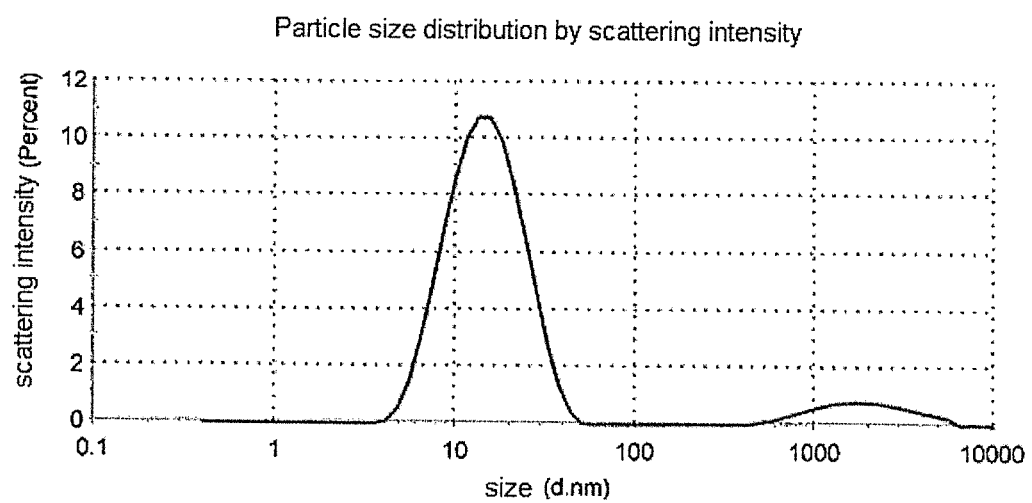
FIG. 5 shows particle size distribution of the platinum colloid of Comparative Example 1.

The particle size distribution of the platinum colloid was determined by dynamic light scattering (Zetasizer Nano ZS, Malvern). The measurement demonstrated that 91.2% of the particles had the particle size of about 16.01 nm and 8.8% of the particles had the particle size of about 2128 nm. Z-average particle size was 14.51 nm (FIG. 5).

Comparative Example 2 (Lot No.: 0795)

A. Materials

TABLE 3

| water | | 4600 ml |
|---|---|---|
| reducing agent | ethanol (99.5%) | 350 ml |
| protecting agent | polysorbate 80 (NOF CORPORATION, OT-221R) | 3 ml |
| platinum ion solution | aqueous chloroplatinic acid | 7.5 ml (platinum: 1.5 g) |

TABLE 3-continued

| pH adjusting agent | aqueous sodium bicarbonate 7.5 g/150 ml, 5 w/v % | 150 ml |
|---|---|---|
| total | | 5110.5 ml |

B. Reduction Reaction

Water was poured into a glass vessel and heated with stirring. When the temperature of the water reached 50° C., the reducing agent and the protecting agent were added to the water. The mixture was further heated with stirring. When the temperature reached 70° C., the pH adjusting agent and the platinum ion solution were added at the same time. The mixture was stirred at 70° C. to promote the reduction reaction. When the platinum ions were reduced to form platinum particles, the brown color of the mixture turned black. At that time the heating and stirring were stopped and the reduction process was ended.

C. Wash, Purification, and Dispensing

After the reduction reaction was finished the reaction mixture was kept settled for 12 hours. The platinum colloid was filtered with a filter paper (Quantitative Filters Papers No. 5C, retaining particle size 1 μm, ADVANTEC). The filtered platinum colloid was concentrated, washed, and purified with an ultrafilter (molecular weight cut off: 10,000, Nihon Millipore K.K) until the conductivity of the permeate was decreased. After the ultrafiltration, the concentration of platinum was adjusted at about 500 ppm with purified water. After the adjustment the pH of the platinum colloid was 3.97. Subsequently the platinum colloid was sterilized, filtered with a filter paper, and dispensed into a vessel.

D. Analysis of Platinum Colloid

ICP emission spectrometry revealed that the concentration of platinum in the platinum colloid was 510 ppm.

Electrophoresis (glass cell) revealed that the zeta potential was (−)22.67 mV.

Example 2 (Lot No.: 5021)

A. Materials

TABLE 4

| water | | 4875 ml |
|---|---|---|
| reducing agent | ethanol (99.5%) | 250 ml |
| protecting agent | polysorbate 80 (NOF CORPORATION, OT-221R) | 2 ml |
| platinum ion solution | aqueous chloroplatinic acid | 7.5 ml (platinum: 1.5 mg) |
| pH adjusting agent | aqueous sodium bicarbonate 7.5 g/150 ml, 5 w/v % | 150 ml |
| total | | 5284.5 ml |

B. Reduction Reaction

Reduction reaction was carried out in the same manner as in Example 1.

C. Wash, Purification, and Dispensing

Wash, purification, and dispensing were carried out in the same manner as in Example 1. After the adjustment of the concentration the pH of the platinum colloid was 3.85.

D. Analysis of Platinum Colloid

ICP emission spectrometry revealed that the concentration of platinum in the platinum colloid was 510 ppm.

Electrophoresis (glass cell) revealed that the zeta potential was (−)34.86 mV.

Example 3 (Lot No.: 5022)

A. Materials

TABLE 5

| water | | 4700 ml |
|---|---|---|
| reducing agent | ethanol (99.5%) | 250 ml |
| protecting agent | polysorbate 80 (NOF CORPORATION, OT-221R) | 1.8 ml |
| platinum ion solution | aqueous chloroplatinic acid | 7.5 ml (platinum 1.5 mg) |
| pH adjusting agent | aqueous sodium bicarbonate 7.5 g/150 ml, 5 w/v % | 150 ml |
| total | | 5109.3 ml |

B. Reduction Reaction

Reduction reaction was carried out in the same manner as in Example 1.

C. Wash, Purification, and Dispensing

Wash, purification, and dispensing were carried out in the same manner as in Example 1. After the adjustment of the concentration the pH of the platinum colloid was 3.95.

D. Analysis of Platinum Colloid

ICP emission spectrometry revealed that the concentration of platinum in the platinum colloid was 510 ppm.

Electrophoresis (glass cell) revealed that the zeta potential was (−)31.15 mV.

Example 4 (Lot No.: 5023)

A. Materials

TABLE 6

| water | | 4700 ml |
|---|---|---|
| reducing agent | ethanol (99.5%) | 225 ml |
| protecting agent | polysorbate 80 (NOF CORPORATION, OT-221R) | 2 ml |
| platinum ion solution | aqueous chloroplatinic acid | 7.5 ml (platinum: 1.5 mg) |
| pH adjusting agent | aqueous sodium bicarbonate 7.5 g/150 ml, 5 w/v % | 150 ml |
| total | | 5084.5 ml |

B. Reduction Reaction

Reduction reaction was carried out in the same manner as in Example 1.

C. Wash, Purification, and Dispensing

Wash, purification, and dispensing were carried out in the same manner as in Example 1. After the adjustment of the concentration the pH of the platinum colloid was 3.85.

D. Analysis of Platinum Colloid

ICP emission spectrometry revealed that the concentration of platinum in the platinum colloid was 510 ppm.

Electrophoresis (glass cell) revealed that the zeta potential was (−)28.28 mV.

Example 5 (Lot No.: 5024)

A. Materials

TABLE 7

| water | | 4875 ml |
|---|---|---|
| reducing agent | ethanol (99.5%) | 225 ml |
| protecting agent | polysorbate 80 (NOF CORPORATION, OT-221R) | 1.8 ml |
| platinum ion solution | aqueous chloroplatinic acid | 7.5 ml (platinum: 1.5 mg) |
| pH adjusting agent | aqueous sodium bicarbonate 7.5 g/150 ml, 5 w/v % | 150 ml |
| total | | 5259.3 ml |

B. Reduction Reaction

Reduction reaction was carried out in the same manner as in Example 1.

C. Wash, Purification, and Dispensing

Wash, purification, and dispensing were carried out in the same manner as in Example 1. After the adjustment of the concentration the pH of the platinum colloid was 3.85.

D. Analysis of Platinum Colloid

ICP emission spectrometry revealed that the concentration of platinum in the platinum colloid was 500 ppm.

Electrophoresis (glass cell) revealed that the zeta potential was (−)31.58 mV.

Example 6 (Lot No.: 5025)

A. Materials

Materials were same as those in Example 1.

B. Reduction Reaction

Reduction reaction was carried out in the same manner as in Example 1.

C. Wash, Purification, and Dispensing

Wash, purification, and dispensing were carried out in the same manner as in Example 1, except that a ultrafilter having 30,000 of molecular weight cut off was used. After the adjustment of the concentration the pH of the platinum colloid was 3.96.

D. Analysis of Platinum Colloid

ICP emission spectrometry revealed that the concentration of platinum in the platinum colloid was 500 ppm.

Electrophoresis (glass cell) revealed that the zeta potential was (−)57.86 mV.

2. Evaluation of Property

The platinum colloids were tested by the method described in Biol. Pharm, Bull, 27 (5), p. 736-738 (2004) for comparison of their reducing activities.

1) Test of Antioxidative Activity Using DCIP

To prepare a DCIP solution, 0.05 g of 2,6-dichloroindophenol sodium n-hydrate (2,6-Dichloroindophenol Sodium Salt: KANTO CHEMICAL CO., INC.) was dissolved in 70 mL of ethanol (99.5%: Wako Pure Chemical Industries, Ltd.), and 1 ml of the obtained solution and another 24 ml of ethanol were mixed.

To prepare a pH buffer, 2.13 g of sodium hydrogen phosphate (Disodium Hydrogenphosphate: Wako Pure Chemical Industries, Ltd.) was dissolved in 180 mL of purified water.

The test using the DCIP solution is one of the methods to determine the reducing activity. DCIP is in the form of $DCIPH_2$ under a reducing condition, but easily re-oxidized with $O_2$ and stabilized in the form of DCIP. Though the DCIP solution has different colors depending on its pH, the solution has no color irrespective of the pH when DCIP is in the form of $DCIPH_2$. For easily detecting the decolorization, the DCIP solution was made blue by adding the pH buffer, which makes the solution alkaline.

A DCIP test solution was prepared by mixing 5 ml of the DCIP solution and 15 ml of the pH buffer. To the DCIP test solution 1 ml of the platinum colloid was added and the time required for the decolorization of the solution was measured. When the platinum colloid has a higher reducing activity (antioxdative activity), the time required for the reduction is shorter.

The results are shown in Table 8.

TABLE 8

| Colloid | Time for decolorization |
|---|---|
| Ex. 1 | 15 sec. |
| Comp. 1 | 15 min. 00 sec. |
| Comp. 2 | 16 min. 30 sec. |
| Ex. 2 | 2 min. 35 sec. |
| Ex. 3 | 3 min. 33 sec. |
| Ex. 4 | 3 min. 09 sec. |
| Ex. 5 | 3 min. 03 sec. |
| Ex. 6 | 8 sec. |

As shown in Table 8, Examples 1 to 6 required remarkably shorter time for the reduction than Comparative Examples 1 and 2. Examples 1 and 6 required the shortest time. Comparative Examples 1 and 2 required 60 times longer time than Example 1. Examples 2 to 5 required one sixth to one fourth time for the reduction compared with Comparative Example 1.

2) Test of Antioxidative Activity Using DPPH

To prepare a DPPH radical solution, 0.005 g of 2,2-diphenyl-1-picrylhydrazyl (SIGMA ALDRICH) was dissolved in 600 mL of ethanol (99.5%: Wako Pure Chemical Industries, Ltd.). To 20 ml of the DHHP radical solution 1 ml of the platinum colloid was added and the time required for the decolorization of the solution was measured. The DHHP radical solution is red-violet, and turns pale yellow when the radicals are scavenged. When the platinum colloid has a higher reducing activity (antioxdative activity), the time required for the reduction is shorter.

The results are shown in Table 9.

TABLE 9

| Colloid | Time for decolorization |
|---|---|
| Ex. 1 | 4 sec. |
| Comp. 1 | 8 min. 00 sec. |
| Comp. 2 | 5 min. 30 sec. |
| Ex. 2 | 1 min. 10 sec. |
| Ex. 3 | 1 min. 20 sec. |
| Ex. 4 | 1 min. 10 sec. |
| Ex. 5 | 1 min. 20 sec. |
| Ex. 6 | 4 sec. |

As shown in Table 9, Examples 1 to 6 required remarkably shorter time for the reduction than Comparative Examples 1 and 2. Examples 1 and 6 required the shortest time. Comparative Examples 1 and 2 required 80 to 120 times longer time than Example 1. Examples 2 to 5 required one seventh to one sixth time for the reduction compared with Comparative Example 1.

3) Decomposition Test of Hydrogen Peroxide, a Reactive Oxygen Species

To 5 ml of aqueous hydrogen peroxide (Hydrogen peroxide: 30%: KOKUSAN CHEMICAL Co., Ltd.) 50 µl of the platinum colloid was added and the time required for the completion of the decomposition reaction was measured. The reaction started immediately after the addition with vigorous liberation of a gas, the termination of which indicated the completion of the reaction. When the platinum colloid has a higher catalytic activity, the reaction time is shorter.

The results are shown in Table 10.

TABLE 10

| Colloid | Time for decomposition |
|---|---|
| Ex. 1 | 2 min. 30 sec. |
| Comp. 1 | 2 min. 30 sec. |
| Comp. 2 | 2 min. 30 sec. |
| Ex. 2 | 2 min. 20 sec. |
| Ex. 3 | 2 min. 30 sec. |
| Ex. 4 | 2 min. 10 sec. |
| Ex. 5 | 2 min. 10 sec. |
| Ex. 6 | 2 min. 36 sec. |

As shown in Table 10, there was no significant difference in the decomposition reaction of hydrogen peroxide between Examples 1 to 6 and Comparative Examples 1 and 2. This suggests that there is no significant difference in the surface areas of the platinum particles produced by the reduction of the platinum ions, as a catalytic activity of a metallic catalyst to decompose hydrogen peroxide depends on its type and surface area. Accordingly, the difference in the reducing activities shown in Tables 8 and 9 is most likely caused by the difference in the nature of the platinum colloids, which are produced by the different methods, rather than the difference in the platinum particles themselves contained therein.

4) Measurement of Redox Potential

The redox potential was measured with an oxidation reduction potentiometer (ORP meter D-72, HORIBA, Ltd.) and a reference electrode (3.33 mol/L KCl—AgCl).

The results are shown in Table 11.

TABLE 11

| Colloid | Redox potential |
|---|---|
| Ex. 1 | 249 |
| Comp. 1 | 254 |
| Comp. 2 | 256 |
| Ex. 2 | 284 |
| Ex. 3 | 278 |
| Ex. 4 | 281 |
| Ex. 5 | 290 |
| Ex. 6 | 226 |

As shown in Table 11, there was no significant difference in the redox potential between Examples 1 to 6 and Comparative Examples 1 and 2.

Tables 12 and 13 summarize the properties of the platinum colloids of Examples 1 to 6 and Comparative Examples 1 and 2. The measurements of the zeta potential indicate that the platinum particles are negatively charged, suggesting that a part of hydrogen atoms adsorbed to the platinum particles (Pt—H) is dissociated as protons (H+) and leaves electrons on the platinum particles. As the electrons migrate from the periphery of the platinum particles throughout the colloid to generate the antioxidative activity of the colloid, one of the reasonable explanations is that the specific composition of the starting materials provides the favorable adsorption of the hydrogen atoms and the favorable condition of the colloid and thus improves the reducing activity of the platinum colloid.

TABLE 12

|  | Ex. 1 |  | Comp. 1 |  | Comp. 2 |  | Condition of measurement |
|---|---|---|---|---|---|---|---|
| Lot no. | 5016 |  | 0793 |  | 0795 |  |  |
| Concentration | 510 ppm |  | 520 ppm |  | 510 ppm |  |  |
| Platinum ion solution | 1.5 g/7.5 ml | 1 | 2 g/10 ml | 1 | 1.5 g/7.5 ml | 1 |  |
| Water | 4700 | 626.7 | 4300 | 430 | 4600 | 613.3 |  |
| Nonionic surfactant | 2 | 0.27 | 5 | 0.5 | 3 | 0.4 |  |
| pH buffering agent (5% conc.) | 7.5 g/150 ml | 20.0 | 10 g/200 ml | 20 | 7.5 g/150 ml | 20 |  |
| Reducing agent | 250 | 33.3 | 500 | 50 | 350 | 46.7 |  |
| pH at dispensing | 3.93 |  | 3.82 |  | 3.97 |  |  |
| Particle size on TEM image | 3.53 nm |  | 3.55 nm |  | not measured |  |  |
| Particle size distribution | 10.49(90.3%) Z-average 10.11 nm | 174.7(6%) | 16.01(91.2%) Z-average 14.51 nm | 2128(8.8%) | not measured |  |  |
| Zeta potential | (−)44.22 mV |  | (−)21.97 mV |  | (−)22.67 mV |  |  |
| DCIP reduction | 15 sec. |  | 15 min. |  | 16 min. 30 sec. |  | 400 µL/20 ml |
| DPPH radical scavenging | 4 sec. |  | 8 min. |  | 5 min. 30 sec. |  | 200 µl/20 ml |

TABLE 12-continued

|  | Ex. 1 | Comp. 1 | Comp. 2 | Condition of measurement |
|---|---|---|---|---|
| Hydrogen peroxide decomposition | 2 min. 30 sec. | 2 min. 30 sec. | 2 min. 30 sec. | 50 μl/5 ml |
| Redox potential | 249 | 254 | 256 | |

TABLE 13

|  | Example 2 | | Example 3 | | Example 4 | | Example 5 | | Example 6 | | Condition of measurement |
|---|---|---|---|---|---|---|---|---|---|---|---|
| Lot no. | 5021 | | 5022 | | 5023 | | 5024 | | 5025 | | |
| Concentration | 510 ppm | | 510 ppm | | 510 ppm | | 500 ppm | | 500 ppm | | |
| Platinum ion solution | 1.5 g/7.5 ml | 1 | 1.5 g/7.5 ml | 1 | 1.5 g/7.5 ml | 1 | 1.5 g/7.5 ml | 1 | 1.5 g/7.5 ml | 1 | |
| Water | 4875 | 650.0 | 4700 | 626.7 | 4700 | 626.7 | 4875 | 650.0 | 4700 | 626.7 | |
| Nonionic surfactant | 2 | 0.27 | 1.8 | 0.24 | 2 | 0.27 | 1.8 | 0.24 | 2 | 0.27 | |
| pH buffering agent (5% conc.) | 7.5 g/150 ml | 20.0 | 7.5 g/150 ml | 20.0 | 7.5 g/150 ml | 20.0 | 7.5 g/150 ml | 20.0 | 7.5 g/150 ml | 20.0 | |
| Reducing agent | 250 | 33.3 | 250 | 33.3 | 225 | 30.0 | 225 | 30.0 | 250 | 33.3 | |
| pH at dispending | 3.85 | | 3.95 | | 3.85 | | 3.85 | | 3.96 | | |
| Particle size on TEM image | not measured | | not measured | | not measured | | not measured | | not measured | | |
| Particle size distribution | not measured | | not measured | | not measured | | not measured | | not measured | | |
| Zeta potential | (−)34.86 mV | | (−)31.15 mV | | (−)28.28 mV | | (−)31.58 mV | | (−)57.86 mV | | |
| DCIP reduction | 2 min. 35 sec. | | 3 min. 33 sec. | | 3 min. 09 sec. | | 3 min. 03 sec. | | 8 sec. | | 400 μL/20 ml |
| DPPH radical scavenging | 1 min. 10 sec. | | 1 min. 20 sec. | | 1 min. 10 sec. | | 1 min. 20 sec. | | 4 sec. | | 200 μl/20 ml |
| Hydrogen peroxide decomposition | 2 min. 20 sec. | | 2 min. 30 sec. | | 2 min. 10 sec. | | 2 min. 10 sec. | | 2 min. 36 sec. | | 50 μl/5 ml |
| Redox potential | 284 | | 278 | | 281 | | 290 | | 226 | | |

For example, the disclosure provides the following embodiments.

(1) A method of producing a platinum colloid, comprising reducing platinum ions by the use of a platinum ion solution, water, a nonionic surfactant, a pH adjusting agent, and a reducing agent, wherein
the platinum ion solution contains platinum at a concentration of 20 w/v %,
the nonionic surfactant is polysorbate 80,
the pH adjusting agent is an alkaline metal salt,
the reducing agent is a lower alcohol,
the volume of the water is from 600 to 660 times that of the platinum ion solution,
the volume of the nonionic surfactant is from 0.20 to 0.30 times that of the platinum ion solution, the volume of the pH adjusting agent as a 5 w/v % aqueous solution is from 10 to 30 times that of the platinum ion solution, and
the volume of the reducing agent is from 27 to 37 times that of the platinum ion solution.

(2) The method according to item 1, wherein the pH adjusting agent is sodium bicarbonate and the reducing agent is ethanol.

(3) The method according to item 1 or 2, wherein the platinum ion solution is an aqueous solution of chloroplatinic acid.

(4) The method according to item 1, wherein the platinum ion solution is an aqueous solution of chloroplatinic acid, the pH adjusting agent is sodium bicarbonate, and the reducing agent is ethanol.

(5) The method according to any one of items 1 to 4, wherein the volume of the water is from 620 to 650 times that of the platinum ion solution.

(6) The method according to any one of items 1 to 5, wherein the volume of the water is from 620 to 630 times that of the platinum ion solution.

(7) The method according to any one of items 1 to 6, wherein the volume of the nonionic surfactant is from 0.24 to 0.30 times that of the platinum ion solution.

(8) The method according to any one of items 1 to 7, wherein the volume of the nonionic surfactant is from 0.26 to 0.28 times that of the platinum ion solution.

(9) The method according to any one of items 1 to 8, wherein the volume of the pH adjusting agent as a 5 w/v % aqueous solution is from 16 to 24 times that of the platinum ion solution.
(10) The method according to any one of items 1 to 9, wherein the volume of the pH adjusting agent as a 5 w/v % aqueous solution is from 18 to 22 times that of the platinum ion solution.
(11) The method according to any one of items 1 to 10, wherein the volume of the pH adjusting agent as a 5 w/v % aqueous solution is from 19 to 21 times that of the platinum ion solution.
(12) The method according to any one of items 1 to 11, wherein the reducing agent is from 30 to 37 times that of the platinum ion solution.
(13) The method according to any one of items 1 to 12, wherein the reducing agent is from 30 to 35 times that of the platinum ion solution.
(14) The method according to any one of items 1 to 13, wherein the reducing agent is from 32 to 35 times that of the platinum ion solution.
(15) The method according to any one of items 1 to 4, wherein
the volume of the water is from 600 to 660 times that of the platinum ion solution,
the volume of the nonionic surfactant is from 0.20 to 0.30 times that of the platinum ion solution,
the volume of the pH adjusting agent as a 5 w/v % aqueous solution is from 16 to 24 times that of the platinum ion solution, and
the volume of the reducing agent is from 27 to 37 times that of the platinum ion solution.
(16) The method according to any one of items 1 to 4, wherein
the volume of the water is from 600 to 660 times that of the platinum ion solution,
the volume of the nonionic surfactant is from 0.24 to 0.30 times that of the platinum ion solution,
the volume of the pH adjusting agent as a 5 w/v % aqueous solution is from 18 to 22 times that of the platinum ion solution, and
the volume of the reducing agent is from 27 to 37 times that of the platinum ion solution.
(17) The method according to any one of items 1 to 4, wherein
the volume of the water is from 620 to 650 times that of the platinum ion solution,
the volume of the nonionic surfactant is from 0.24 to 0.30 times that of the platinum ion solution,
the volume of the pH adjusting agent as a 5 w/v % aqueous solution is from 18 to 22 times that of the platinum ion solution, and
the volume of the reducing agent is from 30 to 37 times that of the platinum ion solution.
(18) The method according to any one of items 1 to 4, wherein
the volume of the water is from 620 to 650 times that of the platinum ion solution,
the volume of the nonionic surfactant is from 0.24 to 0.30 times that of the platinum ion solution,
the volume of the pH adjusting agent as a 5 w/v % aqueous solution is from 18 to 22 times that of the platinum ion solution, and
the volume of the reducing agent is from 30 to 35 times that of the platinum ion solution.
(19) The method according to any one of items 1 to 4, wherein the volume of the water is from 620 to 630 times that of the platinum ion solution,
the volume of the nonionic surfactant is from 0.26 to 0.28 times that of the platinum ion solution,
the volume of the pH adjusting agent as a 5 w/v % aqueous solution is from 19 to 21 times that of the platinum ion solution, and
the volume of the reducing agent is from 32 to 35 times that of the platinum ion solution.
(20) The method according to any one of items 1 to 19, wherein the platinum ion solution and the pH adjusting agent are added at the same time to a reaction mixture containing the water, the nonionic surfactant and the reducing agent.
(21) The method according to any one of items 1 to 20, wherein a reaction mixture containing the water, the nonionic surfactant and the reducing agent is heated to the temperature of from 65 to 75° C. and then the platinum ion solution and the pH adjusting agent are added to the reaction mixture.
(22) The platinum colloid produced by the method according to any one of items 1 to 21.

The invention claimed is:
1. A method of producing a platinum colloid, comprising reducing platinum ions by the use of a platinum ion solution, water, a nonionic surfactant, a pH adjusting agent, and a reducing agent, wherein
the platinum ion solution contains platinum at a concentration of 20 w/v %,
the nonionic surfactant is polysorbate 80,
the pH adjusting agent is an alkaline metal salt,
the reducing agent is a lower alcohol,
the volume of the water is from 600 to 660 times that of the platinum ion solution,
the volume of the nonionic surfactant is from 0.20 to 0.30 times that of the platinum ion solution,
the volume of the pH adjusting agent as a 5 w/v % aqueous solution is from 10 to 30 times that of the platinum ion solution, and
the volume of the reducing agent is from 27 to 37 times that of the platinum ion solution.
2. The method according to claim 1, wherein the pH adjusting agent is sodium bicarbonate and the reducing agent is ethanol.
3. The method according to claim 1, wherein the platinum ion solution is an aqueous solution of chloroplatinic acid.
4. The method according to claim 1, wherein the platinum ion solution is an aqueous solution of chloroplatinic acid, the pH adjusting agent is sodium bicarbonate, and the reducing agent is ethanol.
5. The method according to claim 1, wherein
the volume of the water is from 620 to 630 times that of the platinum ion solution,
the volume of the nonionic surfactant is from 0.26 to 0.28 times that of the platinum ion solution,
the volume of the pH adjusting agent as a 5 w/v % aqueous solution is from 19 to 21 times that of the platinum ion solution, and
the volume of the reducing agent is from 32 to 35 times that of the platinum ion solution.
6. The method according to claim 1, wherein the platinum ion solution and the pH adjusting agent are added at the same time to a reaction mixture containing the water, the nonionic surfactant and the reducing agent.
7. The method according to claim 1, wherein a reaction mixture containing the water, the nonionic surfactant and the reducing agent is heated to the temperature of from 65 to 75°

C. and then the platinum ion solution and the pH adjusting agent are added to the reaction mixture.

8. The platinum colloid produced by the method according to claim 1.

* * * * *